(12) United States Patent
Tharp

(10) Patent No.: US 8,011,643 B2
(45) Date of Patent: Sep. 6, 2011

(54) DIFFUSER ASSEMBLY WITH BUOYANCY VESSEL

(75) Inventor: Charles E. Tharp, Columbia, MO (US)

(73) Assignee: Environmental Dynamics, Inc., Columbia, MO (US)

( * ) Notice: Subject to any disclaimer, the term of this patent is extended or adjusted under 35 U.S.C. 154(b) by 1121 days.

(21) Appl. No.: 11/685,608

(22) Filed: Mar. 13, 2007

(65) Prior Publication Data

US 2008/0224337 A1  Sep. 18, 2008

(51) Int. Cl.
*B01F 3/04* (2006.01)

(52) U.S. Cl. .................. 261/120; 261/122.1; 210/242.2

(58) Field of Classification Search .................. 261/120, 261/121.1, 122.1, 122.2; 210/242.2
See application file for complete search history.

(56) References Cited

U.S. PATENT DOCUMENTS

| 4,029,034 | A |   | 6/1977  | Mason |
|-----------|---|---|---------|-------|
| 4,215,082 | A | * | 7/1980  | Danel ............................ 261/124 |
| 4,287,060 | A | * | 9/1981  | Coggins ......................... 210/194 |
| 4,514,343 | A | * | 4/1985  | Cramer et al. .................. 261/37 |
| 4,563,277 | A |   | 1/1986  | Tharp |
| 5,846,412 | A |   | 12/1998 | Tharp |
| 5,906,774 | A |   | 5/1999  | Loy |
| 6,086,056 | A | * | 7/2000  | Leask et al. ................... 261/120 |
| 6,511,054 | B1 | * | 1/2003 | Green ......................... 261/122.1 |
| 6,514,889 | B1 |   | 2/2003 | Theoret et al. |
| 7,622,040 | B2 | * | 11/2009 | Mitchell et al. ............. 210/242.2 |
| 2005/0087894 | A1 | * | 4/2005 | Campion et al. .............. 261/120 |

FOREIGN PATENT DOCUMENTS

| CA | 2313135 |   | 12/2001 |
|----|---------|---|---------|
| CA | 2313135 | C | 3/2008 |
| WO | WO 88/07977 | * | 10/1988 |

* cited by examiner

*Primary Examiner* — Charles Bushey
(74) *Attorney, Agent, or Firm* — Husch Blackwell LLP

(57) ABSTRACT

A diffuser assembly with a buoyancy vessel and a chamber for buoyantly raising the diffuser assembly for maintenance work. The diffuser assembly has a support structure, diffusers connected to the frame, and a buoyancy vessel positioned on the frame, capable of alternating between a state of buoyancy or ballast.

7 Claims, 3 Drawing Sheets

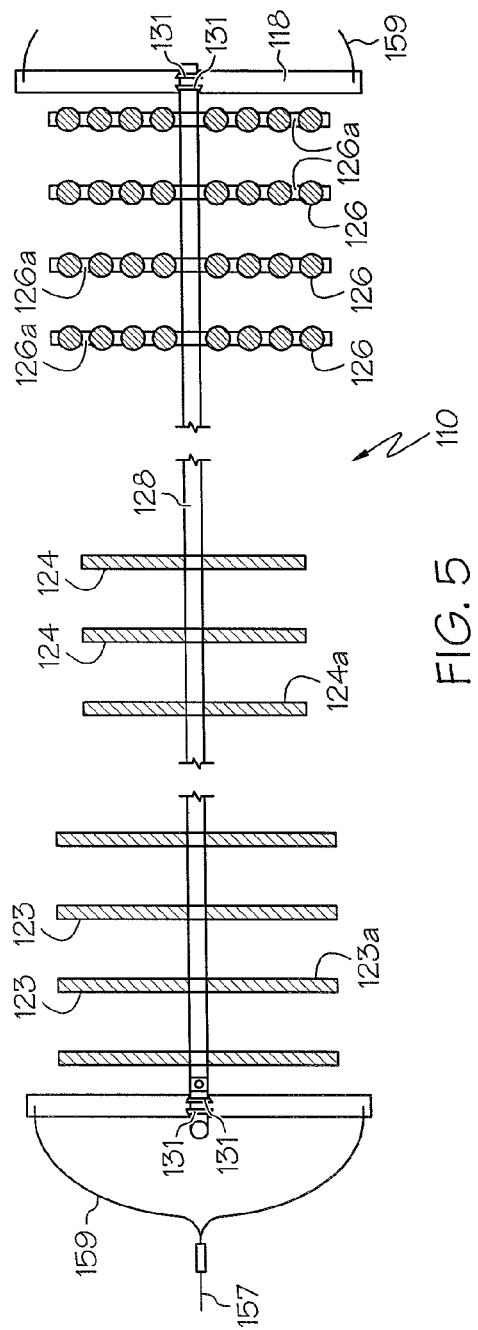
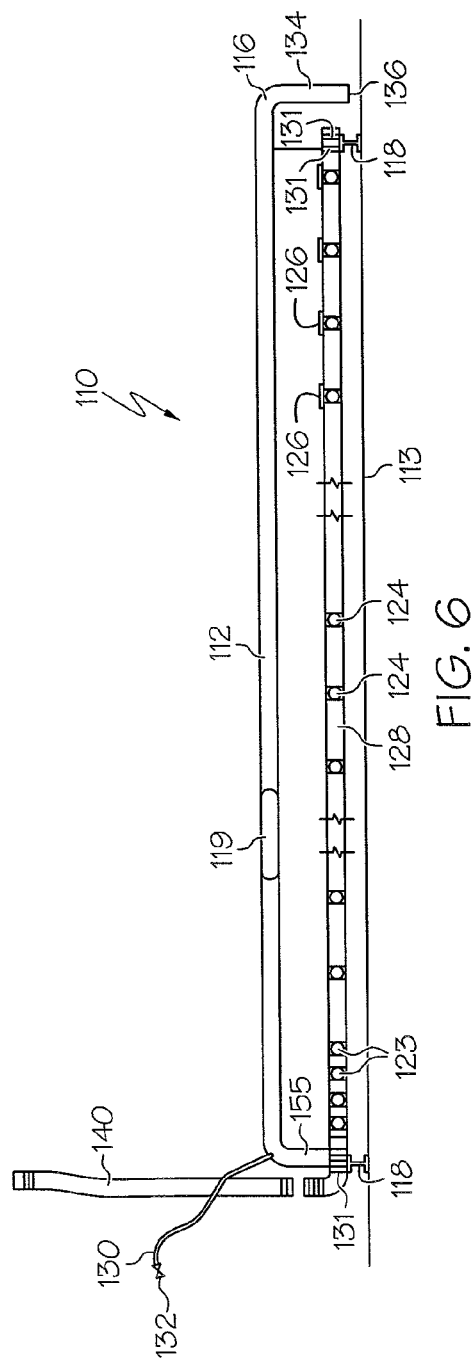

DIFFUSER ASSEMBLY WITH BUOYANCY VESSEL

CROSS-REFERENCE TO RELATED APPLICATIONS

None.

FIELD OF THE INVENTION

This invention relates generally to the treatment of liquid, such as wastewater, by diffusion of air or another gas, and more specifically to the diffusion of air into wastewater for aeration and mixing. The invention deals in particular with an improved diffuser assembly or multi-diffuser module that may be raised individually and separately from other modules. This invention also relates to a method for raising and lowering an individual aerator module for inspection, maintenance or repair, without disturbing the remainder of the modules in a grid structure in a large wastewater treatment basin.

BACKGROUND OF THE INVENTION

In the treatment of wastewater, it is known in the industry to use aeration equipment in order to aerate and mix the wastewater. This aeration equipment may be positioned generally at the bottom of the wastewater basin at an intermediate level in the basin, or allowed to float on the surface of the wastewater reservoir. It is common to use submerged diffusers capable of discharging air into the treatment basin. An example of a particularly effective diffuser is a flexible membrane diffuser. U.S. Pat. No. 5,846,412 issued to Tharp provides an example of an air diffuser and mounting arrangement for use in a water treatment system.

One arrangement for aerating and mixing large wastewater basins makes use of a large number of diffusers contained in separate multi-diffuser modules in a grid pattern throughout the basin. The aeration equipment typically includes a large capacity gas supply source for supplying air to the diffusers. Each individual diffuser is connected to the main air supply conduit via a branch conduit with the diffusers appropriately located throughout the basin to provide thorough mixing and aeration.

When many individual diffusers are positioned in a grid pattern to aerate a large wastewater treatment reservoir, general maintenance and repair become problematic. Locating and retrieving an individual diffuser module is difficult for a variety of reasons. Mechanical retrieval can be expensive and cumbersome, requiring massive cranes to pull each module up from the bottom of the basin. Modules may be located in the center portion or a far-side portion of the basin where they cannot be accessed at all by a crane. In large basins, many modules are inaccessible even to cranes with lengthy booms.

After the repair or maintenance is completed, the individual modules must be placed back in position on the bottom surface of the basin, again with a crane. In order to position the module in the proper orientation on the bottom surface of the basin, the module should not appreciably tip or roll during its descent, which might result in the structure landing improperly on its side or planing sideways during descent. Likewise, if a module is removed from a diffuser grid structure, it should be carefully repositioned within the pattern of the grid. The module should be lowered steadily over its position within the grid, preferably with the module being maintained substantially horizontal as it descends.

In some applications, the main air supply pipes or laterals float on the surface with large diffuser modules suspended from them above the bottom of the basin. The modules are typically suspended on a plurality of flexible air supply lines attached to the floating air laterals. Retrieval of these large diffuser modules in this type of system presents the same types of problems as with bottom mounted modules.

SUMMARY OF THE INVENTION

The present invention is directed to a diffuser assembly with a buoyancy vessel arrangement that is capable of providing individual raising, surface retrieval and lowering of the diffuser assembly separately from other diffuser assemblies in a grid for maintenance or repair of the individual diffusers.

In accordance with one embodiment of the invention, a diffuser assembly or module for use in a wastewater basin is provided where the diffuser assembly includes a frame; a plurality of diffusers positioned on the frame, and a buoyancy vessel (or vessels) positioned over or as part of the frame and including an air inlet conduit and a flow control. The diffuser assembly can be part of a diffuser grid structure where air supply conduits are positioned generally in a grid pattern throughout the bottom of the wastewater treatment basin. Each diffuser assembly may be connected to the main supply conduit by an air supply conduit which is preferably flexible but which may be rigid or semi-rigid. The flotation chamber of the buoyancy vessel is preferably positioned at the level of the diffusers or partially above the diffuser assembly and is operable to provide buoyancy to raise and lower each diffuser assembly in the desired substantially horizontal orientation when diffuser maintenance is necessary, or alternatively, it may provide ballast (when filled with liquid) to lower the unit back to its operating position in the wastewater treatment basin. In order to raise a diffuser assembly, an air control valve can be operated to apply air through an air line to the flotation chamber. The entering gas will displace liquid out of the buoyancy vessel through a buoyancy vessel opening. The buoyancy vessel opening, in one embodiment, is at the end of a down turned elbow, with the opening being positioned below the lowest portion of the buoyancy vessel when the vessel is in a substantially horizontal orientation. This configuration selectively prevents air from escaping the chamber, effectively providing a non-mechanical seal without requiring any mechanical valves or elements to close the opening.

Once the flotation chamber has enough air to make the diffuser assembly buoyant, the diffuser assembly will rise to the surface of the wastewater treatment reservoir with the pressure of the air decreasing during the rise, allowing it to expand and increase the air volume and hence buoyancy. Once the diffuser assembly has reached the surface, it may be moved to the edge of the basin and removed from the basin either by hand or using some type of lift such as a crane. Alternatively, the diffusers can be inspected, repaired or replaced while the unit is in the basin on the surface. Depending on the location of the diffuser assembly relative to the edge of the wastewater treatment basin, it may be desirable to disconnect the air supply from the main air supply conduit. After any maintenance or repairs are conducted, and the operator wishes to return the diffuser assembly to its position in the diffuser grid structure, the diffuser assembly is returned to its previous position on the surface of the wastewater treatment basin. If the air supply has previously been disconnected, it may be reconnected at this time. The operator, in one embodiment, may introduce liquid into the flotation chamber by utilizing the air control valve to bleed air out of the flotation chamber. This causes liquid to re-enter the flotation chamber and act as ballast to sink the unit.

The orientations of the non buoyant components of the diffuser assembly relative to the buoyant components help ensure the diffuser assembly's return to the bottom of the wastewater treatment basin floor in a substantially horizontal orientation. In a preferred embodiment, two symmetrical flotation chamber portions extend along the lateral edges of the frame and substantially above the center of gravity of the diffuser assembly. This arrangement of the chamber is particularly effective in reducing the tendency of the diffuser assembly to roll or tip during descent to the basin floor. Also, at least a portion of the flotation chamber may be positioned above the center of mass or center of gravity of the diffuser assembly when buoyant so that the non-buoyant portion is configured to act as a stabilizer or counterpoise, which inhibits rolling or tipping of the unit, particularly during descent into the basin.

DESCRIPTION OF THE DRAWINGS

In the accompanying drawings, which form a part of the specification and are to be read in conjunction therewith in which like reference numerals are used to indicate like or similar parts in the various views:

FIG. 5 is a top plan view of a diffuser module or assembly constructed according to another embodiment of the invention, with portions broken away; and FIG. 6 is a side elevational view of the diffuser module or assembly shown in FIG. 5.

DETAILED DESCRIPTION OF THE PREFERRED EMBODIMENTS

Figure 1:
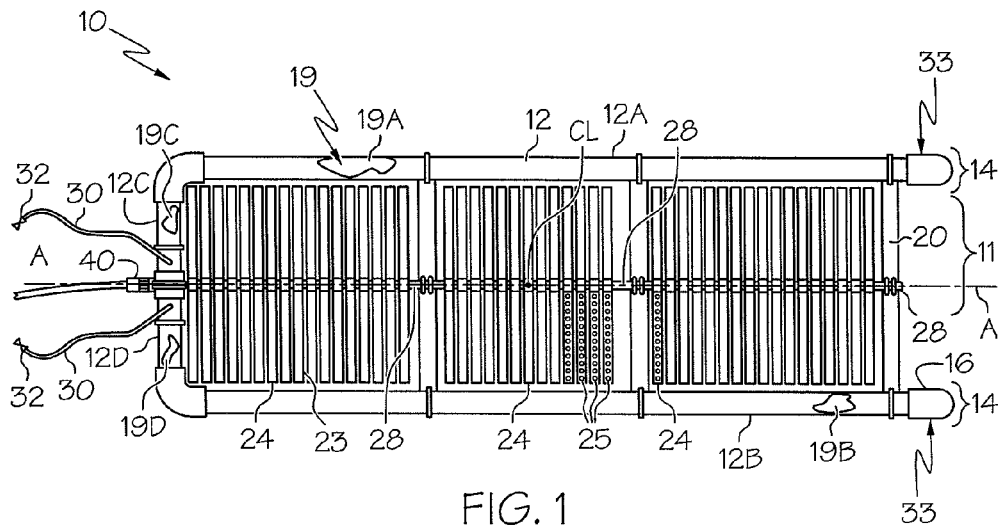
FIG. 1 is a top plan view of a diffuser module or assembly constructed according to one embodiment of the present invention, with portions broken away for illustrative purposes.

Referring now to the drawings in more detail and initially to FIG. 1, the present invention relates in a preferred embodiment to a diffuser assembly or module 10 for use individually or in a diffuser grid structure containing a number of the modules 10. The module 10 has a non-buoyant portion 11 and a selective buoyant portion 14. The non-buoyant portion includes a frame 20 and a diffuser assembly 22 comprising a plurality of individual diffusers 24 arranged parallel to one another. The selective buoyant portion 14 includes a buoyancy vessel 12 having an interior flotation chamber 19. The frame 20 supports the diffuser assembly 22 and the buoyancy vessel 12, operably connecting the structures together. In the illustrated embodiment in FIGS. 1 and 2, the frame 20 has a generally rectangular shape, although the frame could have any suitable shape and size. As used herein, non-buoyant means the object has a density greater than the liquid it is in and will not float on its own and buoyant means the object will float on its own and has a density (including a chamber and its contents) less than the liquid it is in.

Figure 2:
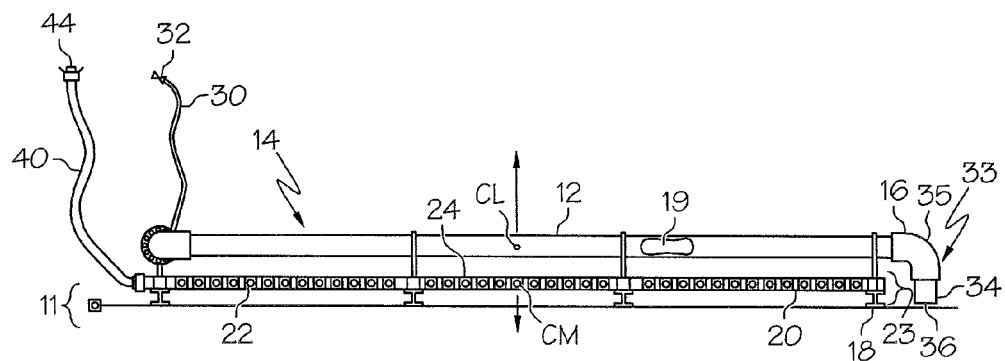
FIG. 2 is a side elevational view of the diffuser assembly shown in FIG. 1.

As shown in FIGS. 1 and 2, the diffuser assembly 22 includes a central header pipe 28 providing a supply of air to the diffusers 24. Air is supplied to header pipe 28 by an air supply conduit 40 which may be equipped with a quick disconnect coupling 44. The diffusers may be tubular membrane diffusers of the type having rigid tubes 23 that receive flexible membranes 25. The size and position of the diffusers 24 may be varied to suit the needs of the particular wastewater treatment process. For simplicity, only representative membranes 25 are shown in FIG. 1. Other types of diffusers can be employed, including disk diffusers and coarse bubble diffusers.

The frame of the diffuser assembly includes a series of transverse ballast beams 18 (FIG. 2) positioned below the diffusers 24. The ballast beams 18 are positioned and sized to provide the ballast required to keep the diffuser module 10 positioned on the bottom of a wastewater basin when operating. The header pipe 28 may be strapped, bolted or otherwise secured on top of the ballast beams 18 at a location extending along the longitudinal axis of the module 10. The wastewater basin may have an earthen, polymeric, metallic or concrete bottom which may invoke different details in the construction of the module 10, particularly in the portions adjacent the bottom.

The buoyancy vessel 12 may take the form of a U-shaped tubular structure that has side portions 12A, 12B preferably extending generally along the length of the assembly parallel to the pipe 28 and perpendicular to the diffusers 24. Coaxial end portions 12C and 12D connect with the respective side legs 12A and 12B through elbow fittings. The shape and size of the buoyancy vessel 12 and chamber 19 may be selected to fit the size profile and buoyancy needs of the module 10. The components that are buoyant during lift are sized and positioned to effect the lift and descent of the module 10 in the wastewater reservoir. Lift and descent may be controlled as discussed below. Additionally, the flotation chamber 19 is preferably positioned relative to the remainder of the module 10 so at least some portion of the chamber 12, and preferably all of it, is located at or above the center of mass (designated CM in FIG. 2) of the non-buoyant portion 11 when the module 10 is in a horizontal orientation. It is not necessary but preferred for the entire body of flotation chamber 19 to be above the non-buoyant portion 11. This configuration enhances stability and allows the module 10 to descend in a substantially horizontal orientation, which limits planning, rolling or flipping of the module 10 during descent.

The configuration, size and orientation of the chamber 19 determines the location of the center of lift (designated as CL in FIG. 2), and the center of lift may change as gas flows in or out of the chamber. The center of lift is the general mean point where the lift forces exerted by the air in the chamber 19 may be considered to be focused. The center of lift relative to the center of mass may vary as the chamber 19 varies between ballast and buoyancy, i.e., as the relative amounts of gas and liquid in the chamber 19 changes.

The buoyancy chamber 19 is in flow communication with gas supply lines such as a pair of flexible air hoses 30 each having a three-way air valve 32. One of the hoses 30 connects to chamber portion 12C and the other hose 30 connects with portion 12D. The portions 12C and 12D are preferably isolated so that flow between them is not permitted The buoyancy vessel 12 terminates in one or more flow control sections 33, each of which may take the form of a down turned elbow 16 presenting a flow control opening 36 communicating between chamber 19 and the exterior to the chamber 19. The opening 36 may be at the lower end of a spout 34. The opening 36, in the illustrated structure can function as an inlet and an outlet for liquid, as will be described. In one embodiment, the elbow 16 forms a generally 90° angle following a bend 35.

The opening 36 is shown as positioned below the level of the center of lift CL when the module 10 is relatively horizontal or level, to allow the opening 36 to function as a self-sealing hydraulic seal when air is in the chamber 19, thereby forming a valve with no mechanical valve elements. It is preferred that the end portion of each side leg 12A and 12B of the flotation chamber be equipped with a flow control section 33 and a flow control opening 36.

The module 10 is normally located in a wastewater treatment basin submerged either on the basin bottom or suspended from floating air laterals. In either case, when air is supplied through hose 40 to the header pipe 28, the air is directed into the diffusers 24 and discharged through slits in the membranes 25 into the wastewater in the form of fine bubbles. This effects aeration and mixing of the wastewater with the fine bubbles efficiently transferring air to the liquid.

Figure 3:
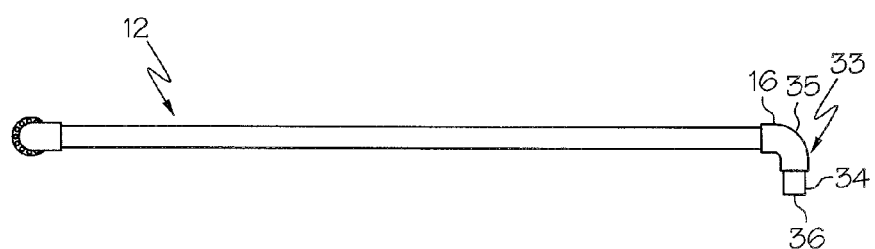
FIG. 3 is a side elevational view of the buoyancy vessel shown in FIGS. 1 and 2.

If the operator wishes to raise the module 10, he or she may commence purging liquid from the chamber 19 through the openings 36 by first opening the air valves 32 to allow gas under pressure to enter the chamber 19 through hoses 30. The following described process will apply to all the embodiments described in this application, but for simplicity this description will only refer to the embodiment shown in FIGS. 1-3. In any embodiment, the chamber 19 is generally filled with liquid when the module 10 is in an operating position on the bottom of the wastewater treatment basin.

As the gas enters the chamber 19, it displaces liquid in the chamber and purges it through openings 36 in flow control sections 33. As the gas displaces the liquid in the chamber 19, the module 10 becomes buoyant and begins to lift off the bottom surface of the wastewater basin, first near the end of the module where the gas is introduced into the chamber 19, which is opposite openings 36. While a plurality of openings 36 and flow control sections 33 are shown, the use of only one of each can suffice in some applications.

As the air enters the chamber 19, openings 36 act as hydraulic seals to prevent gas from escaping the chamber, so long as the openings 36 remain below the level of the chamber 19. In a preferred embodiment, the elbow 16 and position of the openings 36 relative to the chamber 19 create this self-sealing feature without the use of mechanical valve elements or moving parts or other mechanical closures or devices.

The absence of mechanical valves provides for a more trouble free product for use in environments such as wastewater treatment. Mechanical methods to seal the opening could easily become blocked or corroded in the sludge or materials processed by most wastewater treatment works. The absence of mechanical valve obstacles within the flow control section 33 means the present invention offers fewer opportunities for repair problems or malfunction delays. In a less preferred embodiment, the flow control sections 33 could include a mechanical valve upstream from the respective opening 36 for selectively opening and closing the chamber 19 to liquid flow.

Once the gas has displaced most of the liquid from the buoyancy vessel 12, the module 10 will rise as a result of its buoyancy and approach the surface of the liquid in the basin. The operator may then retrieve the module by any convenient method, including towing from a boat or removal by crane. The module 10 may be removed for servicing, repair, or replacement of the diffusers 24 or other components. It may also be serviced while at the surface without removal from the basin. The module 10 can be moved to an edge of the basin where it can be lifted or, often more conveniently, tilted and then lifted out of the basin.

When the operator desires to install the module 10 in the basin following maintenance, he or she can position the module 10 on the surface of the wastewater at the desired location. The operator will then begin to bleed gas from the buoyancy chamber 19 by positioning the three-way valves 32 to allow air to escape from the flotation chamber 19. As the air escapes the chamber 19 through the conduits 30, liquid will begin to re-enter the buoyancy vessel through the openings 36. As the liquid re-enters the buoyancy chamber 19, the vessel 12 begins to lose buoyancy, causing the module 10 to begin its descent to the bottom of the wastewater basin.

The center of lift CL of the buoyant portion 14 is generally above the center of mass CM of the non-buoyant portion 11. The force vector at the center of lift CL is generally in line with and generally above the force vector due to the counterpoise weight of the non-buoyant portion 14. Also, at least a portion of the chamber 19 is preferably positioned above the center of mass of the non-buoyant portion 11. For stability, the buoyant portion includes two chamber legs 19A, 19B located in sides 12A, 12B and each extending along a respective side portion of the module 10. Additionally, the chamber legs or portions 19A, 19B are connected to the separate infeed hoses 30 by vessel portions 12C, 12D which also have a respective chamber portion 19C, 19D therein each communicating with the chamber portions 19A, 19B. The chamber portions 19C, 19D are isolated from each other and provide for buoyancy at the end of the module 10 opposite that of the location of the flow control sections 33. Accordingly, the end of the unit opposite the openings 36 normally rises first and descends last, providing a slight cant or inclination to the module 10. This can help achieve and maintain a seal in the flow control sections 33 while still substantially preventing planning of the diffuser module, particularly during descent.

In an alternative embodiment, a single vessel 12 with a single chamber 19 therein may be provided and preferably would be positioned generally along the longitudinal central axis of the module 10. By proper relative positioning of the center of mass and the center of lift, appropriate ascent and descent may be accomplished. However, two separate chambers spaced apart on opposite sides of the unit is preferred because such a configuration enhances the stability much in the manner of a double pontoon boat.

Figure 4:
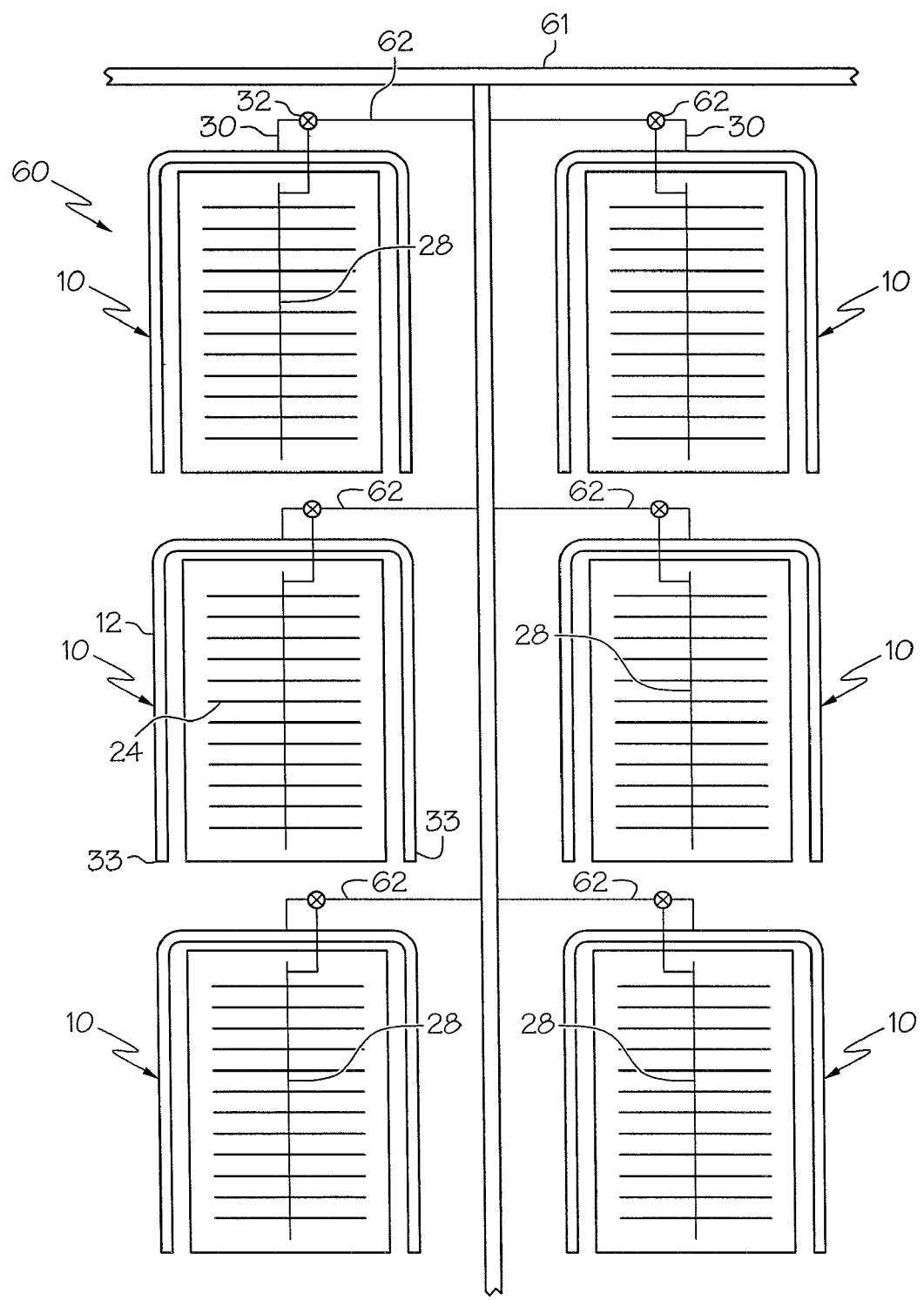
FIG. 4 is a top plan view of a plurality of diffuser assemblies arranged in a grid pattern in accordance with one aspect of the invention.

FIG. 4 illustrates a plurality of modules 10 positioned in a basin 60 in a grid configuration. A gas supply conduit 61 extends along a portion of the reservoir and preferably along a substantial length of a grid system 60. The gas supply conduit is provided with a plurality of gas supply branch conduits 62 connected thereto, each also being connected in flow communication with a respective module 10 through one of the valves 32. The supply conduit 62 connects through valve 32 with both the gas lines 30 and the header pipe 28 so that air can be fed to either the diffusers 24 or the buoyancy vessel 12. When it is desired to raise a module 10, air is fed primarily to the chamber 19 with zero to low air flow to the diffusers through appropriate operation of the valving. A respective module 10 of the grid may be raised or lowered for appropriate maintenance or inspection in the manner previously described.

FIGS. 5 and 6 depict an alternative embodiment of the invention which includes a modified diffuser module 110. The module 110 is equipped with a diffuser assembly which may be of any desired type, including a plurality of large tube diffusers 123 which may be clustered relatively closely together, individual tube diffusers 124 which may be spaced closer together and may be smaller overall than the diffusers 123, or a plurality of disk diffusers 126 mounted along the length of supply pipes 126a. Diffusers 123 may be equipped with flexible membranes 123a which discharge air into the wastewater in the form of fine bubbles. Similarly, diffusers 124 may be equipped with flexible membranes 124a through which air is transferred to the wastewater in the form of fine bubbles. The disk diffusers 126 may be of any suitable type, including bodies having their faces equipped with flexible disk membranes through which air in the supply pipes 126a is delivered to the wastewater in the form of fine bubbles.

The diffusers 123, 124 and/or 126 are mounted on and receive air from a horizontal header pipe 128 which in turn receives air from a blower (not shown) through an air supply conduit 140 which may be a flexible hose. The header pipe 128 extends along the longitudinal center line of the module 110. Ballast beams 118 are secured to the header pipe 128 near its opposite ends by suitable straps 131 or other fastening means.

The module 110 is equipped with a single buoyancy vessel 112 which may be located above the header pipe 128 and arranged to extend above pipe 128 along the longitudinal center line of the diffuser module 110. The buoyancy vessel 112 may take the form of a pipe having a hollow interior forming a flotation chamber 119 (FIG. 6). One end of vessel 112 may be equipped with a down turned elbow 116 which in turn connects with a short vertical spout 134. The lower end of the spout 134 is open to provide a flow control opening 136 that functions in substantially the same manner as opening 36. The buoyancy vessel 112 may be connected with the module 110 in any suitable manner such as being formed as part of a frame that includes the diffuser module and buoyancy vessel 112.

Air is supplied to and bled from the buoyancy vessel 112 through an air hose 130 that connects with the vessel 112 at the end opposite the spout 134. The air hose 130 may be equipped with a valve such as a three-way air valve 132. The end of the buoyancy vessel 112 adjacent to the connection of the air hose 130 may be provided with a down turned leg 155 that connects with the header pipe 128.

The diffuser module 110 may be lifted to the surface by a pair of retrieval cables 157, each connected with a harness 159. The two harnesses 159 connect with the two ballast beams 118 near the opposite ends of the beams.

The embodiment of FIGS. 5 and 6 functions and operates in substantially the same manner as described for the embodiment of FIGS. 1-4. The buoyancy vessel 112 may be supplied with air through the hose 130 in order to effect a buoyant condition of the module 110, causing it to rise to the surface for maintenance and/or repair. The flow control opening 136 functions as a valve to confine the air in the buoyancy vessel 112 while avoiding the ingress of water due to the air pressure. When the buoyancy vessel 112 is bled of air through the air hose 130, water enters the flotation chamber 119, and the module 110 then reverts to a non-buoyant condition in which it descends to the basin floor 113 and remains in place on the floor until it is again made buoyant.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A diffuser module for use in aerating wastewater, said diffuser module comprising:
    a support structure;
    a diffuser assembly mounted to the support structure and having, a plurality of diffusers for applying air to the wastewater;
    at least one buoyancy vessel mounted to the support structure and having a flotation chamber, said vessel being positioned such that a portion of the chamber is positioned above a center of mass of the support structure and diffuser assembly; and
    a flow control opening in flow communication with the chamber and operable to selectively seal the chamber from gas discharge and selectively permit discharge of liquid from the chamber when gas is applied thereto.

2. The module of claim 1, wherein said chamber includes spaced apart sides extending generally along opposite sides of said diffuser assembly.

3. The module of claim 2, including a depending leg extending generally downwardly from said chamber and presenting said flow control opening at a location below the chamber.

4. The module of claim 3, wherein said leg forms part of an elbow member on said vessel.

5. The module of claim 2, wherein said chamber sides are on opposite sides of a center of mass of the module.

6. A diffuser module as set forth in claim 1, wherein said buoyancy vessel comprises a pair of fluid chambers separate from one another.

7. A diffuser module as set forth in claim 1, wherein said at least one buoyancy vessel comprises a single vessel.

* * * * *